3,098,040
WATER-RESISTANT GREASE COMPOSITIONS

Kenneth A. Loftman, Holbrook, Mass., and Peter B. Marsden, Durham, England, assignors to Cabot Corporation, Boston, Mass., a corporation of Delaware
No Drawing. Filed Dec. 19, 1960, Ser. No. 76,467
7 Claims. (Cl. 252—28)

This invention relates generally to grease compositions, and has particular reference to greases formed from lubricating oil thickened with pyrogenic silica.

Lubricating greases for many purposes have been prepared by gelling mineral base lubricating oils with colloidal metal or metalloid oxides, particularly pyrogenic oxides in a powder form, with a particle size of between 15 and 25 millimicrons, resulting from flame hydrolysis of a metal halide. Greases so formed have excellent high temperature properties, but have inferior water resistance, both in the amount of water that can be absorbed without disintegration and in shear stability when a small amount of absorbed water is present.

Much effort has been made to improve the water resistance of pyrogenic-silica thickened greases, particularly by the addition of various organic compounds, such as amines. However, such additives have the undesirable effect of decreasing the thickening power of the oxide gelling agent, and lose their water-resistant effect by decomposition when the grease is exposed to high temperature.

Another type of additive which has been proposed for use in such grease compositions is a class of compounds known as water-insoluble polyalkylene glycols, and their derivatives. These compounds can be formed by the polymerization of alkylene oxides, such as propylene oxide, to a desired average molecular weight and viscosity. We have found that these compounds improve slightly the water resistance of conventional silica thickened greases. For example, a grease made with a highly refined paraffinic oil and pyrogenic silica will absorb 20% of added water without disintegration, whereas the incorporation of 5 to 10% by weight on the silica of a water-insoluble polyalkylene glycol to the grease will enable it to absorb 30% of added water without disintegration. However, such additives are not in general use since the increase in water resistance has been found insufficient to justify the increased cost resulting from the use of the relatively expensive polyalkylene glycols.

The principal object of this invention is to provide a pyrogenic-silica thickened grease composition utilizing a water-insoluble polyalkylene glycol having a viscosity in the range of 10 to 400 centistokes at 100° F., as a waterproofing additive, which has a water resistance far superior to that heretofore obtained with this type of additive.

A further object of the invention is to provide a grease composition of superior water resistance and shear stability which uses a relatively inexpensive lubricating oil as a base.

A further object of the invention is to provide a method of preparing a silica thickened grease which results in greatly improved water resistance.

Other objects of the invention will be apparent to one skilled in the art from the following description of specific embodiments thereof.

In accordance with this invention we have found that the water resistance and shear stability of silica greases with a water-insoluble polyalkylene glycol additive may be increased remarkably by the proper selection of base oil, the control of the mixing procedure, and the use of an optimum percentage of polyalkylene glycol additive.

In general, we have found that in preparing pyrogenic-silica greases with polyalkylene glycol as an additive, these properties may be unexpectedly increased by the use of between about 15% to 30% of a water-insoluble polyalkylene glycol compound, based on the amount of silica present, in combination with a base oil of the lesser refined type, either paraffinic or naphthenic, and/or by a mixing procedure in which the ingredients are exposed to a temperature of about 250° F. to 350° F. for a period of time of about 30 minutes at the lower temperature to about 10 minutes at the higher temperature.

Although any one of these factors influences to some degree the grease properties, it has been unexpectedly found that the proper combination imparts a beneficial effect far greater than would be expected from the effect of the individual factors.

The polyalkylene glycol compounds which we have found to be most satisfactory for use as additives in the present invention are those having a solubility in water at room temperature of less than 1% by weight and preferably less than ½% by weight. Generally speaking, such compounds have viscosities between about 10 and about 500 centistokes (preferably not over 400 centistokes) at 100° F. and average molecular weights in the range between about 400 and about 4000.

Preferably the additive polyalkylene glycol compounds of this invention are derived principally from the polymerization of propylene glycol or propylene oxide or of the corresponding higher homologues, such as butylene oxide and/or glycol and the corresponding higher alkylene compounds. Ethylene oxide or glycol is suitable only as a minor component in a copolymerization with the above named monomers. For example said ethylene monomers can comprise from 10% to 25% by weight of the total provided polymerization is carried to a state sufficient to produce a substantially water-insoluble product.

In addition to the ordinary unmodified polymers of alkylene oxides and glycols, closely related derivatives of such polymers, such as their mono- and di-ethers, can also be used as additives in the present invention. Particularly suitable are the mono-ethers of the above described polyalkylene glycol or oxide polymers, such as the ethyl, propyl or butyl mono-ethers. Such compounds are described for example, in U.S. Patent 2,425,755 which issued to F. H. Roberts and H. R. Fife on August 19, 1947.

Following are examples of various greases which were prepared to demonstrate the effect of these factors. In these examples, the greases were mixed in approximately one pound quantities by premixing the ingredients with a propeller mixer, and then subjecting the mixture to one pass through a laboratory three-roll mill with a clearance of 0.015 inch between the final rolls.

Water resistance was determined by two procedures:

(1) Determining the shear stability in the presence of water by comparing the penetration into the grease of of a standard ASTM test cone before and after working 10,000 strokes with 10% added water in a motorized grease worker. The shear stability is expressed as percent increase in penetration.

(2) By the Navy Water Absorption test MIL-G-16908, which determines the amount of water the grease is capable of absorbing without disintergration, expressed as percent by weight of the original weight of the grease. This test requires that the grease be capable of absorbing at least 50% water without disintegration.

The following examples demonstrate the effect of the type of base oil on pyrogenic silica thickened greases with a suitable water-insoluble polyalkylene glycol compound as the additive.

Table I

| Batch | 1 | 2 | 3 | 4 |
|---|---|---|---|---|
| 1. Composition: | | | | |
| Highly refined paraffinic oil (Nuray 66 [1]) pts. by wt. | 100 | 100 | | |
| Moderately refined paraffinic oil (Faxam 58 [1]) pts. by wt. | | | 100 | |
| Moderately refined naphthenic oil (Coray 55 [1]) pts. by wt. | | | | 100 |
| Thickener (Pyrogenic silica) pts. by wt. | 8 | 8 | 8 | 8 |
| Polyalkylene glycol compound (Ucon LB-1145 [2]) (percent by weight of thickener) | 0 | 20 | 20 | 20 |
| 2. Mixing Temperature, °F | 80 | 80 | 80 | 80 |
| 3. Water Resistance: | | | | |
| (a) Percent water absorbed before disintegration | 20 | 30 | 70 | 75 |
| (b) Percent increase in penetration of test cone after 10,000 strokes with 10% added water | 81 | 20 | 17 | 16 |

[1] Nuray 66, Faxam 58 and Coray 55 are trade names of Esso Standard Oil Company of New Jersey.
[2] Ucon LB-1145 is the trade name of Carbide and Carbon Chemicals Co. for a polyalkylene oxide adduct of butyl alcohol formed by adding a mixture of alkylene oxides composed predominantly of propylene oxide (the balance of not over 10+ by weight being ethylene oxide to butyl alcohol) and maintaining the mixture under polymerization conditions using a small amount of powdered NaOH as catalyst until there is formed a monobutyl ether of a polyalkylene glycol which has a solubility in water of less than ½% at room temperature and a viscosity at 100° F. of 248 centistokes. Its refractive index at 20° C. is 1.451 and its density at 60° F. is 1.003 g./cc.

The above data may be summarized as follows. Assuming a normal pyrogenic-silica thickened grease of the prior art (batch #1) as a control, we find from the data of batch #2 that the addition of 20% by weight (based on the weight of said pyrogenic silica) of the water-insoluble polyalkylene glycol compound increases the water absorption ability from 20% to 30%, and provides a considerable improvement in the shear stability. However, from the data of batches #3 and #4, we see that by the use of a moderately refined paraffinic or naphthenic oil, it is possible to increase the water absorption ability of the grease to 70% and 75% respectively, a value high enough to be acceptable under the Navy test mentioned in column 2, line 62.

The effect of premixing the greases of Table I at an elevated temperature as described hereinbefore, is shown in the following table.

Table II

| Batch | 1 | 2 | 3 | 4 |
|---|---|---|---|---|
| Percent water absorbed before disintegration, no preheating (From Table I) | 20 | 20 | 20 | 20 |
| Percent water absorbed before disintegration, preheated at 300° F. for 15 minutes | 25 | 115 | 100 | 85 |
| Percent increase in penetration of test cone after 10,000 strokes with 10% added water, no preheating (From Table I) | 81 | 20 | 17 | 16 |
| Percent increase in penetration of test cone after 10,000 strokes with 10% added water, preheated at 300° F. for 15 minutes | 20 | 2 | 10 | 4 |

The above data show that the preheating treatment of the oils containing the water-insoluble polyalkylene glycol compound provided a further substantial increase in water absorption ability. In the case of batch #1, preheating in the absence of the polyalkylene glycol additive provided only a minor increase in the ability of the grease to absorb water, whereas preheating with the polyalkylene glycol compound present provided a remarkable and unexpected increase in water resistance.

The terms "highly refined" and "moderately refined" are commonly used in the art to refer to oils of this type. A highly refined paraffinic oil has a flash point of between about 450° F. and 560° F., a viscosity index of between about 120 and 100 and a pour point of between about −20° F. and +15° F. A moderately refined paraffinic oil has a flash point of between about 340 and about 440° F., a viscosity index of between about 70 and 90, and a pour point of between about 20° F. and 35° F.

A moderately refined naphthenic oil has a flash point of between about 330° F. and 430° F., a viscosity index of between about 25 and 35, and a pour point of between about −40° F. and −10° F.

To demonstrate the effect of the concentration of the polyalkylene glycol additive, following is a tabulation of test data made on 4 greases of similar composition with various amounts of the same water-insoluble polyalkylene glycol compound. All greases were premixed for 10 minutes at 300° F.

Table III

| Batch | 8 | 9 | 10 | 11 |
|---|---|---|---|---|
| Lubricating Oil (highly refined paraffin type), pts. by wt. (Nuray 146) | 100 | 100 | 100 | 100 |
| Thickener (pyrogenic silica), pts. by wt. | 8 | 8 | 8 | 8 |
| Ucon LB-1145 polyalkylene glycol compound (Percent based on weight of thickener) | 5 | 10 | 15 | 20 |
| Water Resistance: | | | | |
| (a) Percent water absorbed before disintegration | 30 | 45 | 80 | 80 |
| (b) Percent increase in penetration of test cone after working 10,000 strokes with 10% added water | 28 | 28 | 14 | 9 |

The above data show that when the concentration of the water-insoluble polyalkylene glycol compound is increased beyond 10% by weight (based on the pyrogenic silica thickener), an unexpected increase is obtained in grease properties. Increasing the amount of this additive from 10% to 15% nearly doubles the ability of the grease to absorb water without failure, and also doubles the shear stability of the grease in the presence of 10% added water. Increasing the amount of polyalkylene glycol to 20%, although providing no further increase in the ability of the grease to absorb water, does provide a marked further increase in the shear stability in the presence of water.

Since certain obvious modifications may be made in the grease compositions disclosed herein without departing from the scope of the invention, it is intended that all matter contained herein be interpreted in an illustrative and not in a limiting sense.

This application is a continuation-in-part of U.S. application Serial No. 692,540, filed October 28, 1957, and now abandoned. It should be pointed out that the respective recorded heat treatment times and temperatures of 15 minutes at 300° F. for the greases of Table II and 10 minutes at 300° F. for those of Table III are illustrative of the preferred period of between about 5 and 15 minutes at a temperature of between about 300° F. and 400° F. as set out in original claims of application Serial No. 692,540 as filed. It should also be noted that, although the preferred particle size of the pyrogenic silica is between 15 and 25 millimicrons as previously described, pyrogenic silicas having an average particle size of between 10 and 40 millimicrons are available and are entirely satisfactory for use in the present invention as indicated by the disclosure and claiming of this latter range of particle sizes in the original claims of said parent application Serial No. 692,540.

We claim:

1. A grease composition consisting essentially of a moderately refined mineral lubricating oil selected from the group consisting of (1) a paraffinic oil with a flash point of between about 340° F. and about 440° F., a viscosity index of between about 70 and about 90 and a pour point between about 20° F. and about 35° F. and (2) a naphthenic oil with a flash point of between about 330° F. and about 430° F., a viscosity index of between about 25 and about 35 and a pour point of between about −40° F. and about −10° F.; sufficient pyrogenic silica having an average particle size of between 10 and 40 millimicrons to gel the oil into a grease-like consistency; and from about 15% to about 30% by weight of the silica of a water-insoluble polyalkylene glycol compound having a viscosity at 100° F. of between about 10 and about 400 centistokes.

2. A grease composition as described in claim 1 wherein the polyalkylene glycol compound is present in an amount of at least 20% by weight of the silica.

3. A grease composition as described in claim 1 in which the alkylene units in said polyalkylene glycol compound predominantly consist of units containing at least 3 carbon atoms per unit.

4. A method of increasing the water resistance of a mineral lubricating oil thickened with pyrogenic silica which comprises adding thereto from 15% to 30% by weight of said silica of a water-insoluble polyalkylene glycol having a viscosity at 100° F. of between about 10 and about 500 centistokes, and heating the resulting mixture for about 5 to about 15 minutes at a temperature of between about 300° F. and about 400° F.

5. In a method of thickening mineral lubricating oils with pyrogenic silica, the improvement which comprises the steps of adding to the composition from 15 to 30% by weight of the silica of a water-insoluble polyalkylene glycol having a viscosity at 100° F. of between about 10 and about 400 centistokes and heating the thus modified composition for a period of from about 5 to about 15 minutes at a temperature of about 300° F.

6. In a method of thickening with a pyrogenic silica a mineral lubricating oil selected from the group consisting of (1) a paraffinic oil with a flash point of between about 340° F. and about 440° F., a viscosity index of between about 70 and about 90 and a pour point of between about 20° F. and about 35° F. and (2) a naphthenic oil with a flash point of between about 330 and about 440° F., a viscosity index of between about 25 and about 35 and a pour point of between about —40° F. and about —10° F., the improvement which comprises the steps of adding to the composition from 15 to 30% by weight of said silica of a water-insoluble polyalkylene glycol compound having a viscosity at 100° F. of between about 10 and about 500 centistokes and heating said thus modified composition for a period of from about 5 to 15 minutes at a temperature in excess of about 300° F.

7. The process described in claim 6 in which the alkylene units in said polyalkylene glycol compound predominantly consist of units containing at least 3 carbon atoms per unit.

References Cited in the file of this patent

UNITED STATES PATENTS

| | | |
|---|---|---|
| 2,573,650 | Peterson | Oct. 30, 1951 |
| 2,629,691 | Peterson | Feb. 24, 1953 |

OTHER REFERENCES

"Ucon" by Carbide and Carbon Chem. Corp., N.Y., 1947, pp. 1–20.